United States Patent [19]
Ohki et al.

[11] Patent Number: 5,361,096
[45] Date of Patent: Nov. 1, 1994

[54] METHOD AND APPARATUS FOR MULTIPLEX TRANSMISSION OF VIDEO SIGNALS IN A PLURALITY OF CHANNELS WITH REFRESH CONTROL UTILIZING INTRAFRAME CODING

[75] Inventors: Junichi Ohki; Toshio Koga, both of Tokyo, Japan

[73] Assignee: NEC Corporation, Tokyo, Japan

[21] Appl. No.: 131,439

[22] Filed: Oct. 4, 1993

Related U.S. Application Data

[63] Continuation of Ser. No. 839,102, Feb. 19, 1992, abandoned.

[30] Foreign Application Priority Data

Feb. 27, 1991 [JP] Japan .................................. 3-031268

[51] Int. Cl.⁵ .............................................. H04N 7/13
[52] U.S. Cl. ................................ 348/387; 348/415; 348/419
[58] Field of Search ............... 358/136, 135, 133, 141, 358/142, 146; 348/385, 386, 387, 415, 419; 370/79, 77, 80, 84, 85.7, 95.1, 95.3; H04N 7/13, 7/137, 7/08

[56] References Cited

U.S. PATENT DOCUMENTS

| | | | |
|---|---|---|---|
| 4,215,369 | 7/1980 | Iijima | 358/146 |
| 4,731,664 | 3/1988 | Nishiwaki et al. | 358/136 |
| 4,975,771 | 12/1990 | Kassatly | 358/146 |
| 4,985,768 | 1/1991 | Sugiyama | 358/136 |
| 5,136,378 | 8/1992 | Tsurube | 358/136 |

FOREIGN PATENT DOCUMENTS 0038811 3/1977 Japan ................................ 358/146

OTHER PUBLICATIONS

Kaneko et al. "Digital Transmission of Broadcast Television with Reduced Bit Rate" NTC '77 Conference Record, Los Angeles, Calif. USA 5-7 Dec. 1977.

*Primary Examiner*—David E. Harvey

[57] ABSTRACT

Time-varying picture signals of a plurality of channels are predictively coded by utilizing the interframe correlation and multiplexed at the transmitting side. The signals are separated for each channel, switched and selected for any channel for decoding at the receiving side after transmitted. When the receiving channel is switched over to other channel, a decoding error can occur and a reproduced screen can collapse since the predicting signals do not coincide with each other at the transmitting and receiving sides. Therefore, when the plurality of channels is selectively switched for decoding by using a single decoder, the refresh is repeated at predetermined time intervals in a short period of time by utilizing the intraframe correlation when the coding is carried out at the transmitting side so that, even if the channel is switched, an excellent reproduced screen may be immediately obtained. However, during the refresh, the compression ratio is reduced compared with that of the bit rate when a normal interframe correlation is carried out. Therefore, when the refresh is carried out, the amount of transmitted information for part or all of the channels other than the refreshed channel is compressed and, conversely, the amount of transmitted information for the refreshed channel is increased by the compressed amount and allocated. Thus, even if the channel is switched at the receiving side, the decoded image for the newly selected channel can be promptly reproduced.

6 Claims, 8 Drawing Sheets

METHOD AND APPARATUS FOR MULTIPLEX TRANSMISSION OF VIDEO SIGNALS IN A PLURALITY OF CHANNELS WITH REFRESH CONTROL UTILIZING INTRAFRAME CODING

This is a continuation, of application Ser. No. 839,102, filed Feb. 19, 1992, now abandoned.

BACKGROUND OF THE INVENTION

1. Field of the Invention

The present invention relates to a method of coding time-varying picture signals utilizing a bandwidth compression technique and an apparatus for implementing the same.

2. Description of the Related Art

Images are classified as still pictures or dynamic pictures. The latter varies in its statistical characteristics with the passage of time and in the following description its signal will be referred to as a time-varying picture signal. Code-transmitting techniques for the time-varying picture signals which utilize an interframe correlation are known in the art.

Figure 1:
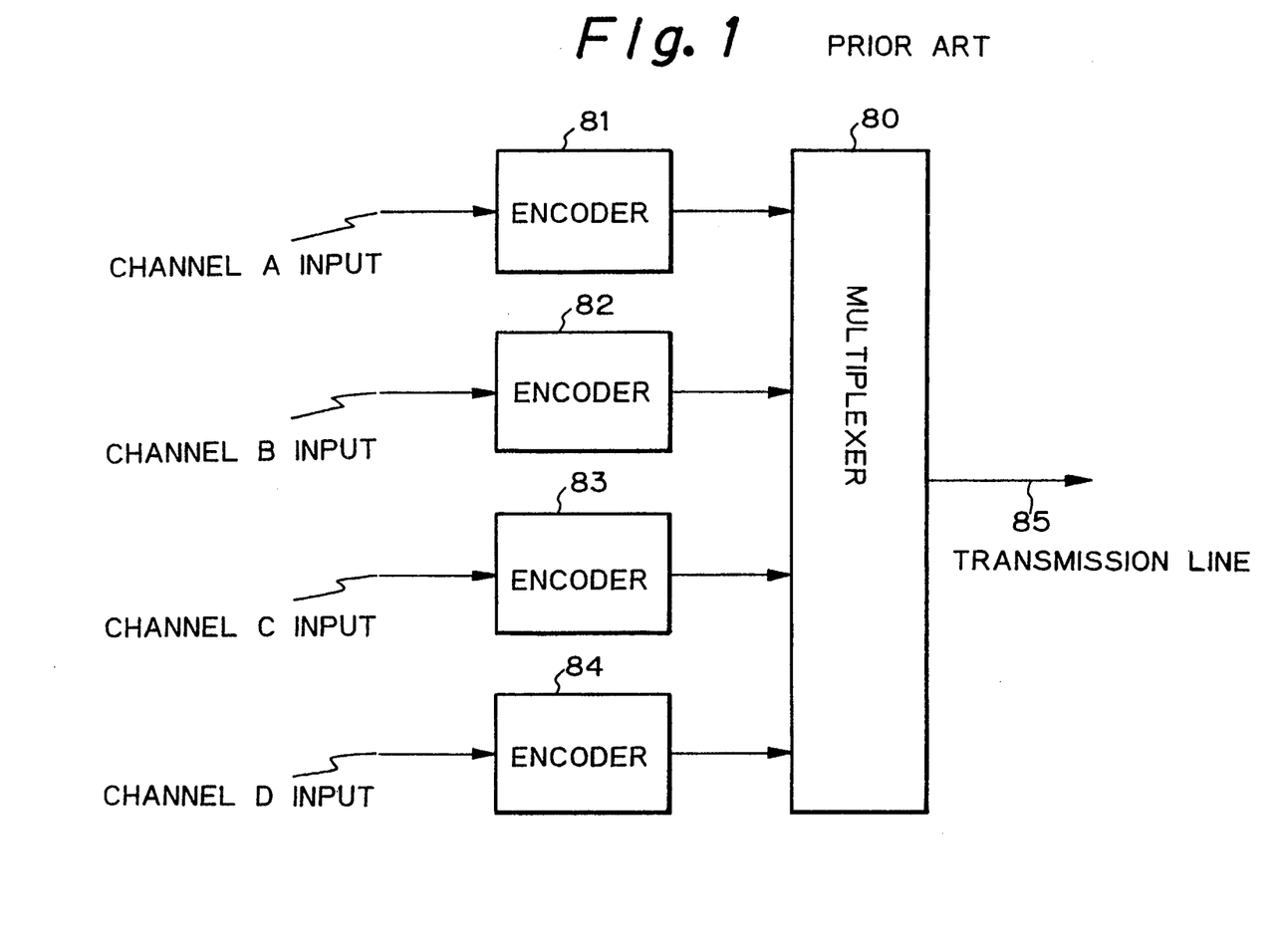
FIG. 1 is a block diagram of a transmitting portion of a conventional time-varying picture signal transmitting apparatus.
Figure 2A:
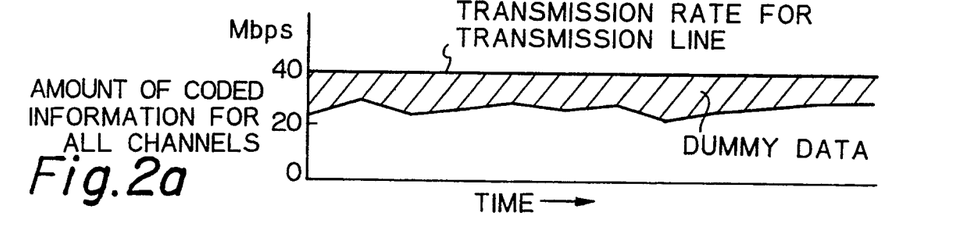
FIG. 2(a) is a timing chart revealing the amount of coded information for all the channels within a conventional four-channel transmission line.
Figure 2B:
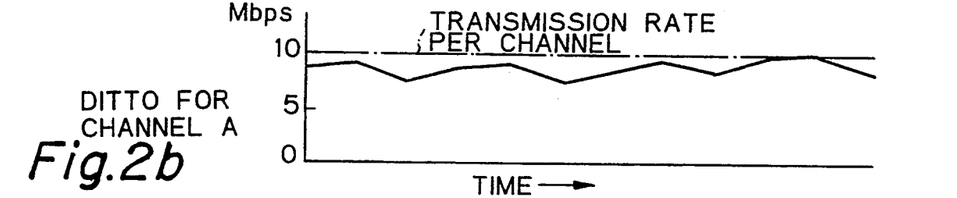
FIGS. 2(b) through (e) are respectively timing charts revealing the amount of coded information for each of channels A, B, C and D thereof.
Figure 2C:
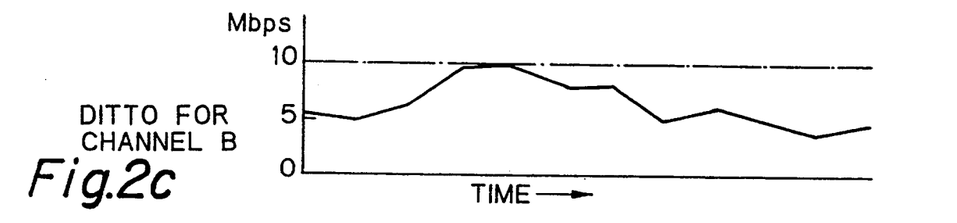
Figure 2D:
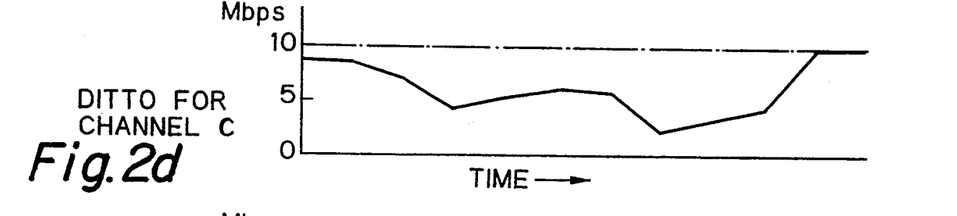
Figure 2E:
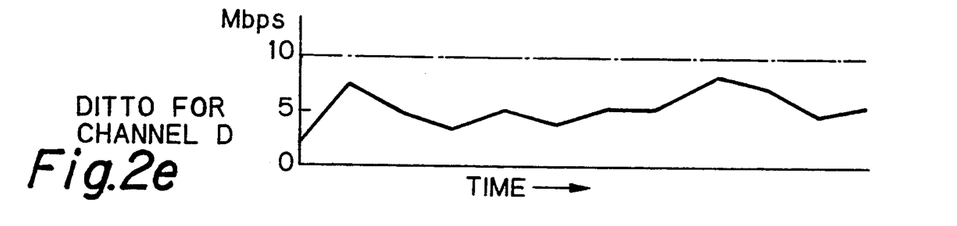

FIG. 1 illustrates a conventional system for coding time-varying picture signals by utilizing an interframe correlation, in which a plurality of channels, for example, four channels, are transmitted in a block. Conventionally, the transmission clock of channel A, B, C and D is each fixedly given from multiplexer 80 to each of encoders 81, 82, 83 and 84, respectively, so that the output of encoders 81 through 84 may be multiplexed by multiplexer 80 for transmission. Let us assume that the transmission rate of transmission line 85 is, for example, 40 Mbps and that 10 Mbps is allocated to each channel. In that case, since the time-varying picture signals entered to each channel differ from each other, the amount of coded information will vary for each channel or time, as shown in FIGS. 2(b), (c), (d) and (e). Although, as described above, 10 Mbps of information is allocated for each channel, it can often happen that, depending on the degree of motion of the entered time-varying picture signal or the nature of the pattern, the 10 Mbps of information is not fully utilized. Since the transmission rate of the transmission line is constant (40 Mbps), if the sum of the coded information of each channel is below 40 Mbps, then, by filling some dummy data into a margin which is left to fill up the 40 Mbps, it is controlled so that the transmission rate of the line becomes constant (40 Mbps). If the signal is decoded at the receiving side by a single decoder, then each channel of the transmitted multiplexed signal is separated by a demultiplexer, so that any arbitrary channel output is selected as the input to the decoder.

However, when the coding is carried out by utilizing the interframe correlation, if the channel selected at the receiving side is switched to another channel, then a decoding error can occur and a reproduced image can collapse, because the predicting signal of the coder at the transmitting side and that of the decoder at the receiving side do not coincide with each other.

SUMMARY OF THE INVENTION

In view of the above-described drawbacks inherent to the conventional technique for multiplexedly transmitting time-varying picture signals, an object of the present invention is to provide a novel method of transmitting time-varying picture signals and an apparatus for implementing the same which allow an excellent reproduced image to be immediately obtained by switching a plurality of channels at the receiving side even if the decoding is performed by a single decoder.

In order to achieve this end, when the time-varying picture signal is coded by utilizing the interframe correlation and transmitted from the transmitting side, it is necessary to have the predictive image signals within each frame memory of the encoder at the transmitting side and the decoder at the receiving side coincide with each other by repeatedly carrying out promptly the coding in a short period of time by utilizing the intraframe correlation (this process is hereinafter referred to as "refresh").

However, since this refresh utilizes the intraframe correlation, the compression ratio of the coded signal can be reduced more than when a normal interframe correlation is utilized. In consequence, when the refresh is carried out, more information will be generated than when normal coding is carried out. When the transmission rate of the transmission line is, for example, 40 Mbps and a four-channel transmission system is used, if normal coding is carried out for each channel by utilizing the interframe correlation, the maximum coding rate has conventionally been limited to within 10 Mbps so that the amount of information may not exceed 10 Mbps. In contrast, the present invention utilizes the fact that the entered time-varying picture signal for each channel is independent of each other and no correlation is present therebetween. That is, it is extremely improbable for the amount of coded information for each channel at any timing to all become maximal (10 Mbps for each channel).

Thus, in the method of coding and transmitting the time-varying picture signal according to the present invention, while the time-varying picture signal is transmitted, in the predictive coding of the signal at the transmitting side, the refresh is carried out for each channel at arbitrary preset time intervals, so that rewriting of the content of the frame memory of the predictive coding circuits at both the transmitting and receiving sides is carried out in a short period of time. When the above-described rewriting is carried out on a certain channel, the amount of transmitted information is reduced for part or all of the channels other than the refreshed channel to increase the amount of transmitted information for the refreshed channel. In this case, the refreshed unit may be per pixel, scanning line or frame. In addition, the refresh time intervals may be constant or inconstant. Still further, two or more channels can be simultaneously refreshed.

The present invention also provides a coding/transmitting apparatus using the above-described coding/-transmitting method. At the transmitting side, this apparatus comprises:

encoders in each of which the predictive coding of the entered time-varying picture signal is carried out by utilizing the intraframe correlation when, during transmission of the time-varying picture signal, the rewriting of the content of the frame memory of the predictive coding circuit is instructed; and a rewriting control for instructing the rewriting to the encoders for the specified channel at specified time intervals while increasing the amount of the transmitted information for the rewritten channel, and also for instructing a reduction in the amount of transmitted information for part or all of the channels other than the rewritten channel, according to a predetermined algorithm.

An apparatus at the receiving side, after separating the received image multiplex signal for each channel, switches and selects the receiving channel to decode the received signal by a decoder.

The above and other objects, features and advantages of the present invention will become apparent from the following description when taken in conjunction with the accompanying drawings which illustrate preferred embodiments of the present invention by way of examples.

DETAILED DESCRIPTION OF THE PREFERRED EMBODIMENTS

A specific embodiment of the present invention is hereinafter described with reference to the accompanying drawings.

Figure 3:
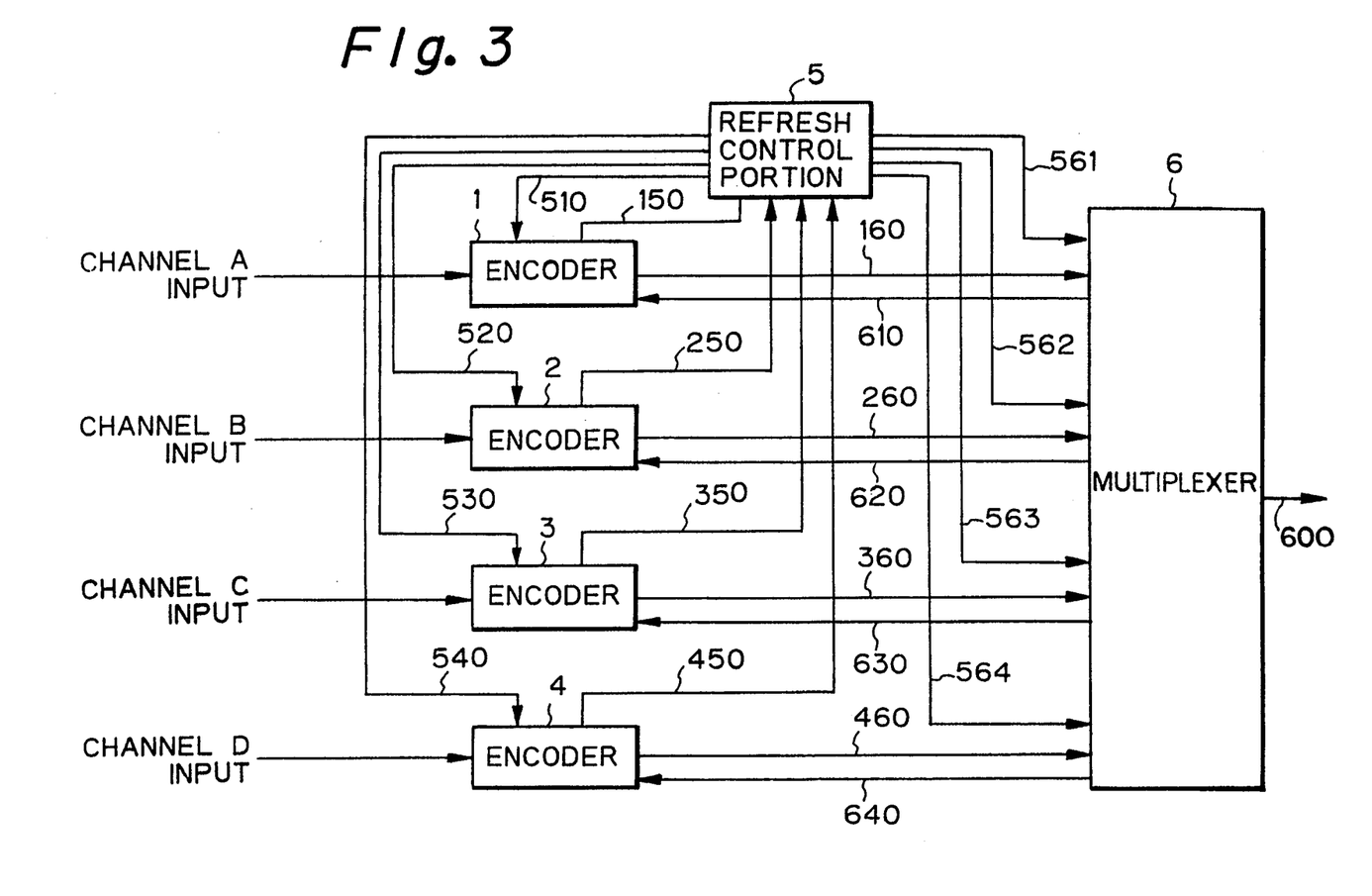
FIG. 3 is a block diagram illustrating an arrangement of the transmitting portion according to a specific embodiment of the present invention.

Encoders 1, 2, 3 and 4 of the transmitting apparatus shown in FIG. 3 (a four-channel multiplex transmission apparatus) according to the specific embodiment of the present invention each predictively code a time-varying picture signal entered from channels A, B, C and D, respectively, in accordance with each specified clock to transmit to multiplexer 6. Multiplexer 6 supplies a clock to each of encoders 1 through 4 according to a control signal for specifying the amount of transmitted information for each channel, which is entered from refresh control portion 5. Multiplexer 6 also multiplexes each of the coding signals entered from each of encoders 1 through 4 to transmit to the transmission line. Refresh control portion 5 constantly controls encoders 1 through 4 and multiplexer 6 so that the time-varying picture signal for each of channels A, B, C and D may be multiplexed for transmission.

Figure 4:
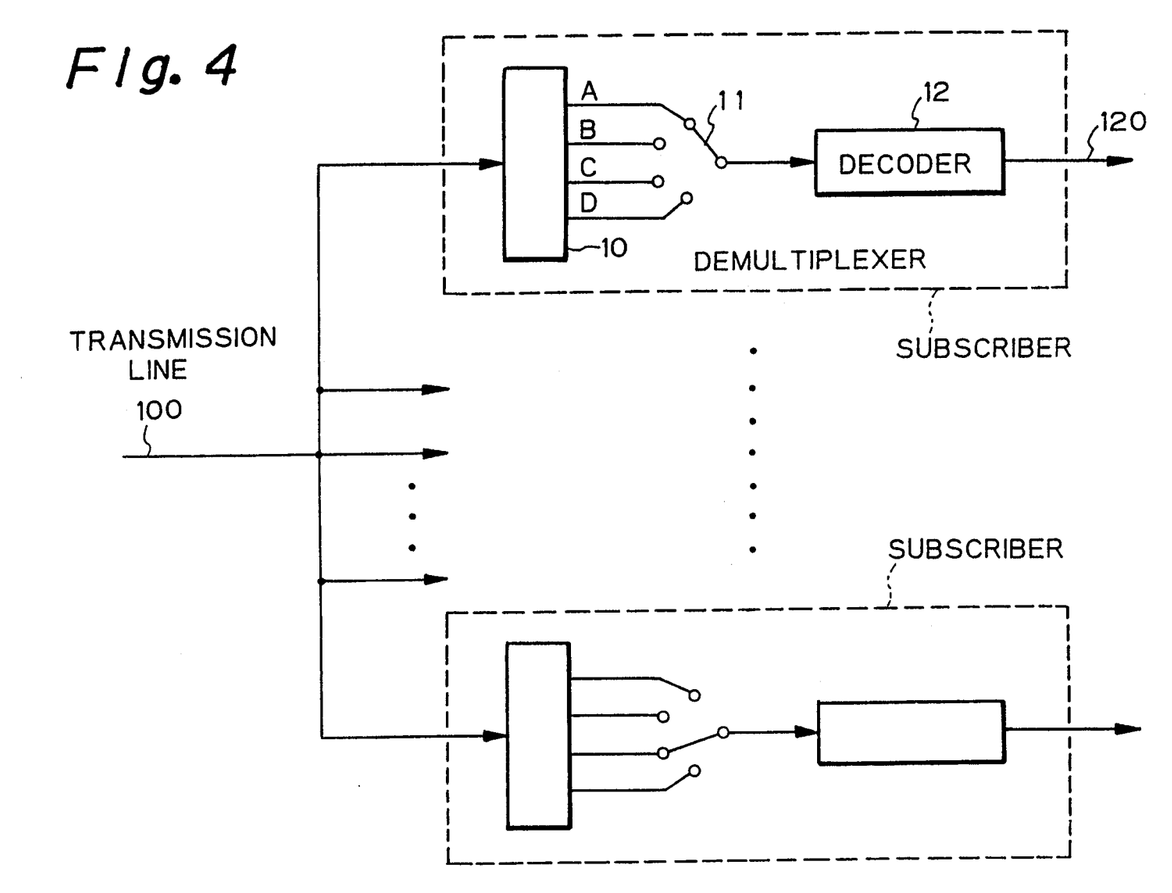
FIG. 4 is a block diagram illustrating an arrangement of the receiving portion according to the embodiment of FIG. 3.

The receiving apparatus shown in FIG. 4 is comprised of a plurality of subscribers each connected to transmission line 100. Each subscriber is comprised of demultiplexer 10 for separating the multiplexer signals entered from transmission line 100 for each of channels A, B, C and D, switch 11 for selecting the channel and decoder 12 for decoding the selected signal.

Next, the operation of this embodiment and, in particular, the refresh per frame is described with reference to the drawings.

Assuming now that the transmission rate of the transmission line is 40 Mbps, it is allocated by 10 Mbps to each of channels A, B, C and D of FIG. 3 except for the refresh time. The time-varying picture signal of each of channels A, B, C and D is supplied to encoders 1, 2, 3 and 4, respectively. When the refresh is carried out for channel A at a certain time $t_1$ (FIG. 6), refresh control portion 5 monitors the amount of coded information which is supplied from encoders 2, 3 and 4 via lines 250, 350 and 450, respectively, to allocate the amount of transmitted information. Assuming that the amount of information coded by encoder 2 at time $t_1$ is, for example, 10 Mbps, the amount of the information coded by encoder 3 is 5 Mbps and that coded by encoder 4 is 5 Mbps, refresh control portion 5 applies a control signal for giving 20 Mbps of information to encoder 1 via line 561 to multiplexer 6, applies a control signal for giving 10 Mbps of information to encoder 2 via line 562 to multiplexer 6, applies a control signal for giving 5 Mpbs of information to encoder 3 via line 563 to multiplexer 6 and applies a control signal for giving the amount of information of 5 Mbps to encoder 4 via line 564 to multiplexer 6. Refresh control portion 5 also applies a signal for indicating the execution of the refresh via line 510 to encoder 1, and applies signals indicating nonexecution of the refresh via lines 520, 530 and 540, to encoder 2, 3 and 4, respectively. Since the signal supplied via line 510 indicates the execution of the refresh, encoder 1 codes the entered time-varying picture signal for channel A by utilizing the intraframe correlation to carry out the refresh. It emits a signal indicating the execution of the refresh by embedding it within a mode signal indicating the coding condition. The time-varying picture signal which has been refreshed and the mode signal of the output of encoder 1 are read out in accordance with the clock supplied from multiplexer 6 via line 610 and are supplied to multiplexer 6 via line 160. Since the signal supplied via line 520 indicates the nonexecution of the refresh, encoder 2 codes the entered time-varying picture signal for channel B by utilizing the normal interframe correlation, and emits a signal indicating that the coding was carried out by utilizing the normal interframe correlation by embedding it within the mode signal. The coded time-varying picture signal and the mode signal of the output of encoder 2 are read out in accordance with the clock supplied via line 620 from multiplexer 6 and are supplied to multiplexer 6 via line 260. Since the signal supplied via line 530 indicates the nonexecution of the refresh, encoder 3 codes the entered time-varying picture signal for channel C by utilizing the normal interframe correlation, and emits a signal indicating that the coding was carried out by utilizing the normal interframe correlation by embedding it within the mode signal. The coded time-varying picture signal and the mode signal of the output of encoder 3 are read out in accordance with the clock supplied from multiplexer 6 via line 630 and are supplied via line 360 to multiplexer 6. Since the signal supplied via line 540 indicates the nonexecution of the refresh, encoder 4 codes the entered time-varying picture signal for channel D by utilizing the normal interframe correlation, and emits a signal indicating that the coding was carried out by utilizing the normal interframe correlation by embedding it within the mode signal. The coded time-varying picture signal and the mode signal of the output of encoder 4, are read out in accordance with the clock supplied from multiplexer 6 via line 640, and are supplied via line 460 to multiplexer 6.

Figure 7:
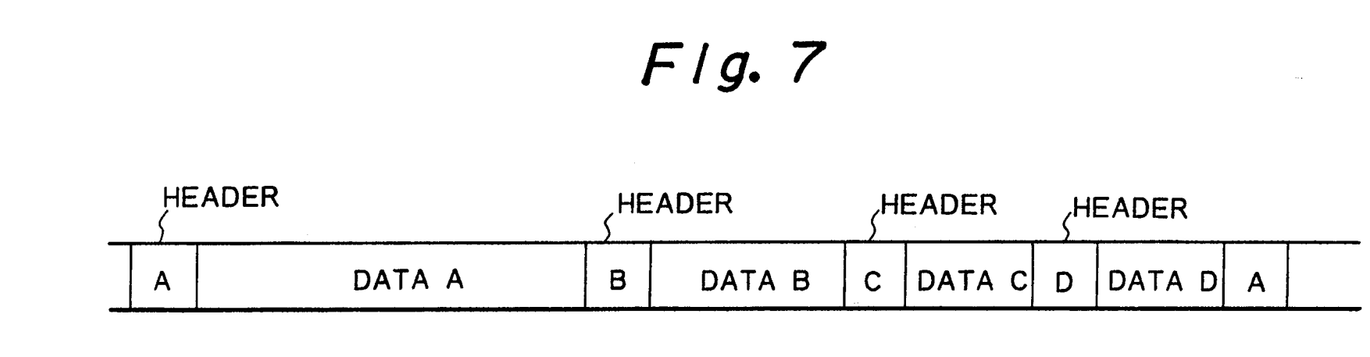
FIG. 7 is an arrangement of a multiplexed transmission signal according to each embodiment of the present invention.

Since the control signal supplied from refresh control portion 5 via line 561 indicates that 20 Mbps of information is to be given, multiplexer 6 supplies a clock of 20 Mbps via line 610 to the encoder 1, and supplies a clock of 10 Mbps via line 620 to encoder 2 because the control signal supplied from refresh control portion 5 via line 562 indicates that 10 Mbps of transmitted information is to be given. Since the control signal supplied from refresh control portion 5 via line 563 indicates that 5 Mbps of transmitted information is to be given, multiplexer 6 supplies a clock of 5 Mbps via line 630 to encoder 3 and, since the control signal supplied from refresh control portion 5 via line 564 indicates that 5 Mbps of information is to be given, the clock of 5 Mbps is supplied via line 640 to encoder 4. Multiplexer 6 multiplexes the coded signals supplied from encoders 1, 2, 3 and 4, and emits them via line 600 to the transmission line. An example of the output signal time-division-multiplexed by multiplexer 6 is illustrated in FIG. 7. At multiplexer 6, a header for identifying the channel is given to the head of each channel signal and, following the header of each channel, data corresponding to the amount of transmitted information per unit of time is allocated. That is, the greater the amount of transmitted information of the channel is, the more bits are allocated.

Figure 8:
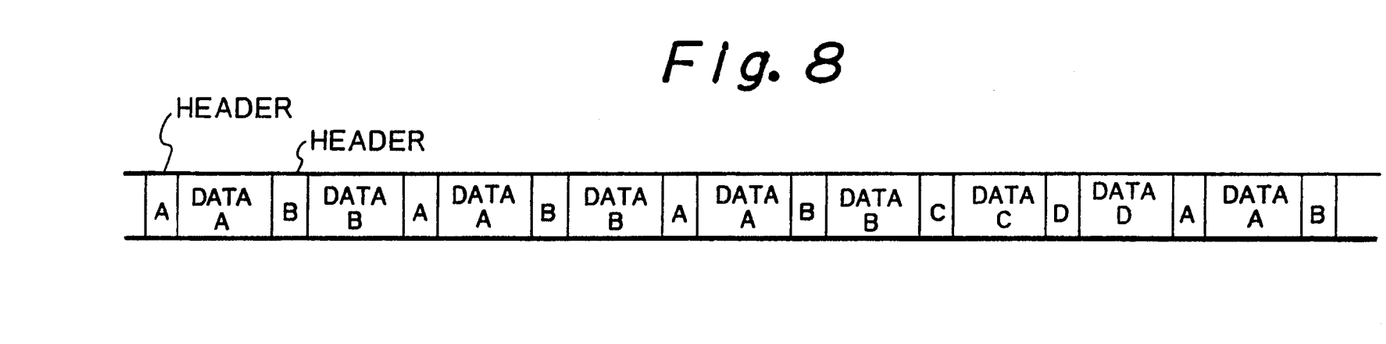
FIG. 8 is another arrangement of the multiplexed transmission signal according to each embodiment of the present invention.

Next, an example of an output signal in which data is transmitted for each predetermined transmission unit (cell) by multiplexer 6 is illustrated in FIG. 8. The cell is comprised of a header portion for identifying the channel and a data portion. The signal for each channel is stored in this data portion and transmitted. At this time, the length of each cell is constant, and the number of the cells for each channel is increased or decreased according to the amount of transmitted information. That is, the emitting frequency of a cell for a channel having much information to be transmitted is increased while that of a cell for a channel having less information to be transmitted is decreased.

As described above, assuming that a single time refresh is completed for channel A and the refresh is executed for channel B at the next frame time, refresh control portion 5 monitors the amount of coded information for channels A, C and D to determine the amount of information to be transmitted by channel B. That is, it monitors the amount of coded information for the channels other than the refreshed channel to allocate the transmission rate of the refreshed and other channels. Then, the refresh is also carried out on channels C and D in the same manner.

When the refresh is carried out, the amount of transmitted information given to the normal coding channel using the interframe correlation may also be set to a value still lower than the above-described 10 Mbps or 5 Mbps so that more information can be allocated for transmission to the refreshed channel. For example, at time $t_1$ in FIG. 6, 9 Mbps of information may be allocated to channel B while 4 Mbps of information may be allocated to each of channels C and D. Further, 23 Mbps may be allocated to channel A to be refreshed.

Thus, by allocating more information to the refreshed channel than to the other channels, the transmission rate of the transmission line can be held constant, and an efficient utilization of the transmission line can be realized without filling any dummy data.

Next, the operation at the receiving apparatus is described with reference to FIG. 4. The multiplexed signal via transmission line 100 is supplied to demultiplexer 10 of each subscriber 13. Demultiplexer 10 emits the signal supplied from transmission line 100 by separating for each channel. The subscriber switches switch 11 to select the channel. The signal selected by switch 11 is supplied to decoder 12, which decodes the signal of the channel selected by switch 11. In decoding, the mode signal is first decoded to take out a signal embedded within the mode signal during the coding which indicates whether the refresh was executed or not and, if the signal which was taken out indicates the execution of the refresh, then the signal is decoded by using the intraframe correlation; otherwise, it is decoded by using the interframe correlation. The reproduced time-varying picture signal of the output of decoder 12 is emitted via line 120.

Figure 5:
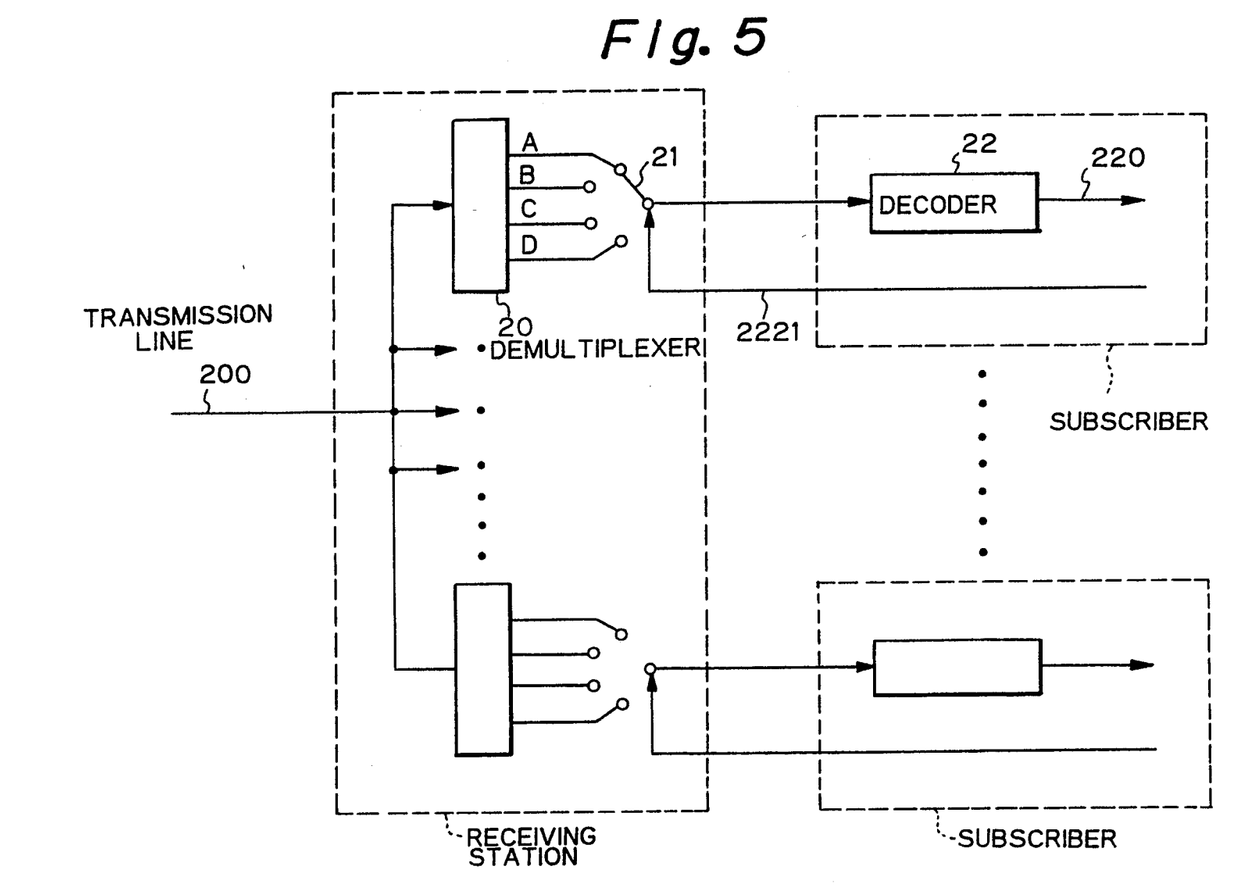
FIG. 5 is a block diagram illustrating the receiving portion according to another embodiment of the present invention.
Figure 6A:
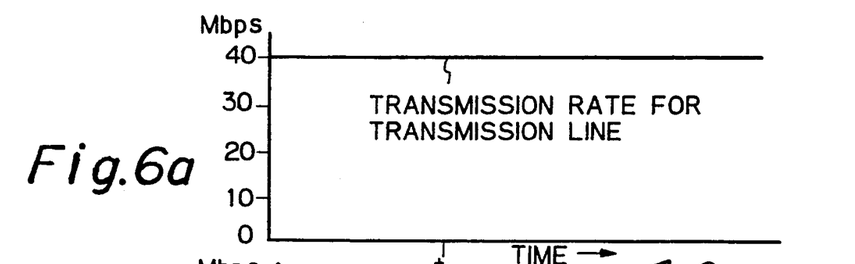
FIG. 6(a) is a timing chart illustrating the entire amount of coded information for a four-channel time-varying picture signal transmission line using a specific embodiment of the present invention.
Figure 6B:
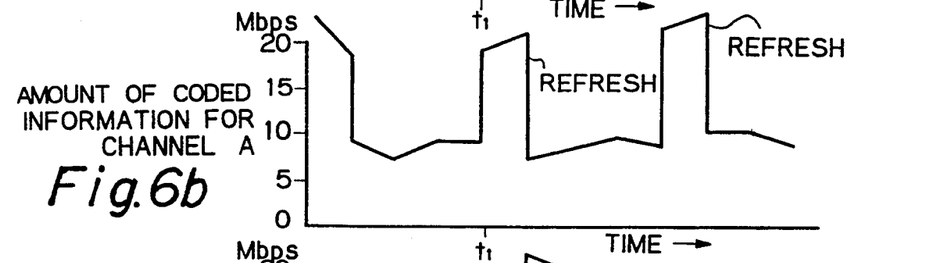
FIGS. 6(b) through (e) are respectively timing charts illustrating the amount of coded information for each of channels A, B, C and D thereof.
Figures 6C, 6D:
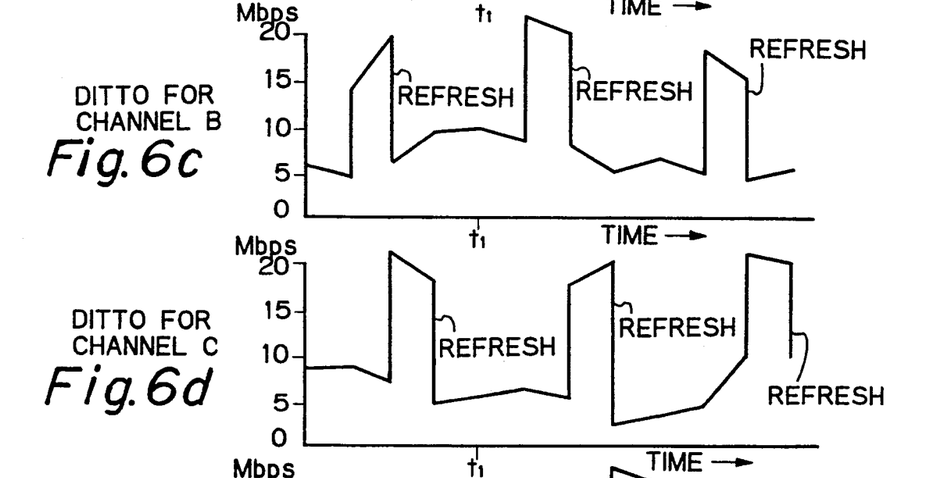
Figure 6E:
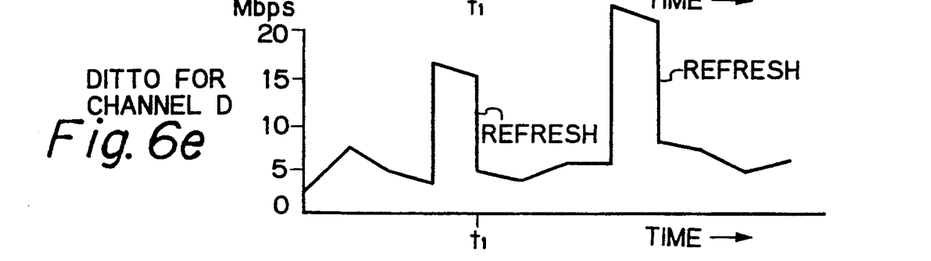

Next, another embodiment of the receiving apparatus is described with reference to FIG. 5. The multiplexed signal transmitted via transmission line 200 is supplied to multiplexer 20 of the receiving station, which separates the multiplexed signal for each channel for emitting. The signal emitted by demultiplexer 20 is selected by switch 21 to be supplied to decoder 22 of subscriber 14 via subscriber line 300. At this time, the channel selective signal for switch 21 is supplied via line 2221 from the subscriber side, Decoder 22 decodes the mode signal and takes out the signal embedded within the mode signal during the coding which indicates whether the refresh was executed or not and, if the signal which was taken out indicates the execution of the refresh, then the decoding is carried out by using the intraframe correlation; otherwise, decoding is carried out by using the interframe correlation. The time-varying picture signal reproduced by decoder 22 is emitted via line 220. If, as in this embodiment, the channel is selected at the receiving office according to the request from subscriber 14 and the selected coding data is sent to subscriber 14, then the transmission rate (in this embodiment, 20 Mbps) between the station and the subscriber can be lower than that between the stations (in this embodiment, 40 Mbps)

Figure 9A:
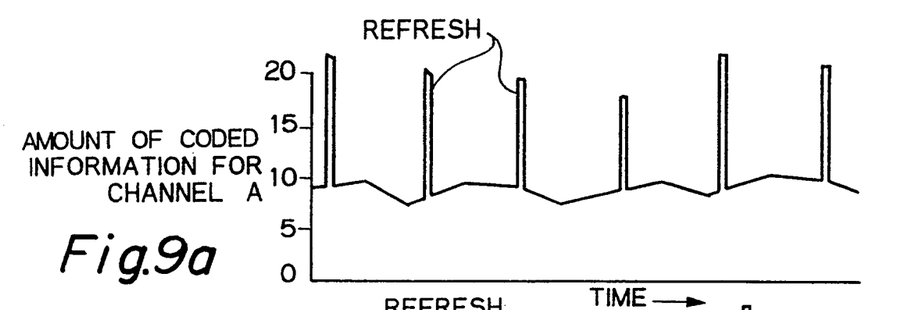
FIGS. 9(a) through (d) are respectively timing charts illustrating the amount of coded information for each of channels A, B, C and D within the four-channel transmission line using still another embodiment of the present invention.
Figures 9B, 9C:
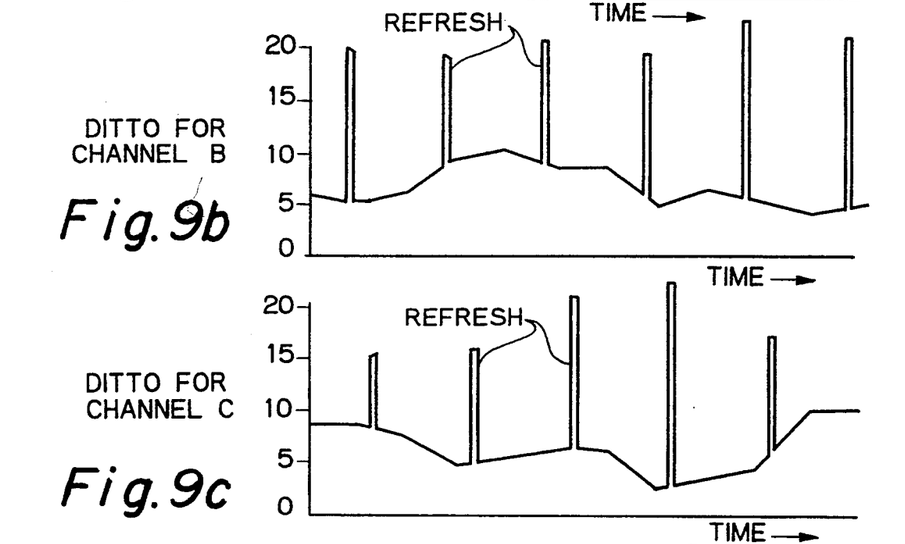
Figure 9D:
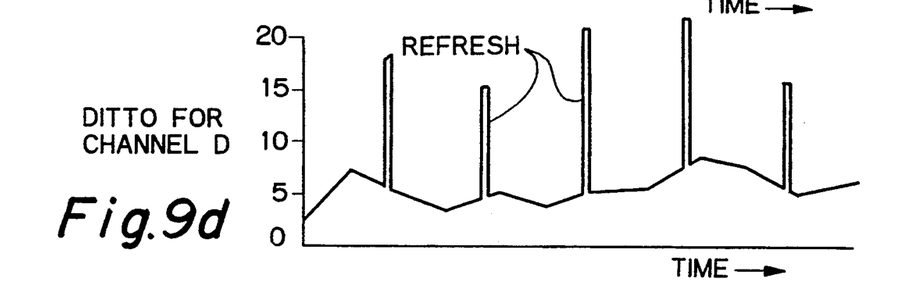

Although, in the above description, the refresh is carried out once on a single frame, it is also possible to refresh per pixel or per single or any plurality of scanning lines according to the algorithm set to refresh control portion 5. FIG. 9 illustrates a case in which the refresh of each of channels A, B, C and D was carried out for each plurality of scanning lines. If, as described above, the refresh for a single frame is gradually executed for each plurality of scanning lines with a predetermined cycle over a plurality of frame time intervals, then the plurality of channels can be refreshed in a block because the amount of coded information for each frame can be prevented from abruptly increasing, compared with the case in which the refresh is carried out per unit of frame. In addition, although the foregoing described that the refresh is carried out with a predetermined cycle, as will be apparent from the principle of the present invention, if only the refresh of each channel is completed within a short period of time, then it does not matter whether its manner is cyclic or not; either case is effective.

Although certain preferred embodiments of the present invention have been shown and described in greater detail, it should be understood that various changes and modifications may be made thereto without departing from the scope of the appended claims.

What is claimed is:

1. A method of transmitting time-varying picture signals for a plurality of channels via a multiplex transmission line of constant speed, comprising the steps of:

at a transmitting side,
   normally coding said time-varying picture signals by an encoder of each channel utilizing an interframe predictive coding technique;
   multiplexing said time-varying picture signals of the plurality of channels and transmitting multiplexed time-varying picture signals to a receiving side;
   while at the receiving side,
   demultiplexing said transmitted time-varying signals of the plurality of channels and selecting a desired channel;
   decoding the time-varying signals of a selected channel by a decoder of said channel utilizing an interframe predictive decoding technique;
   and while said time-varying picture signals are being transmitted,
   coding and decoding said time-varying signals by the encoder and the decoder utilizing an intraframe predictive coding technique and an intraframe predictive decoding technique, respectively, in a short period of time repeatedly at specified time intervals per predetermined number of pixels in a frame so that a predetermined number of pixels in said frame are refreshed for said channel during a time-varying picture transmission through said multiplex transmission line; and
   decreasing, during said intraframe predictive coding by the encoder, the amount of transmitted information for part or all of the channels other than the channel executing the coding by intraframe predictive coding technique while increasing the amount of transmitted information for said channel, wherein said specified time intervals are non-constant.

2. A method of transmitting time-varying picture signals for a plurality of channels via a multiplex transmission line of constant speed, comprising the steps of:

at a transmitting side,
   normally coding said time-varying picture signals by an encoder of each channel utilizing an interframe predictive coding technique;
   multiplexing said time-varying picture signals of the plurality of channels and transmitting multiplexed time-varying signals to a receiving side;
   while at the receiving side,
   demultiplexing said transmitted time-varying signals of the plurality of channels and selecting a desired channel;
   decoding the time-varying signals of a selected channel by a decoder of said channel utilizing an interframe predictive decoding technique;
   and while said time-varying picture signals are being transmitted,
   coding and decoding said time-varying signals by the encoder and the decoder utilizing an intraframe predictive coding technique and an intraframe predictive decoding technique, respectively, in a short period of time repeatedly at specified time intervals per predetermined number of scanning lines in a frame so that a predetermined number of scanning lines in said frame are refreshed for said channel during a time-varying picture transmission through said multiplex transmission line; and
   decreasing, during said coding using intraframe predictive coding technique by the encoder, the amount of transmitted information for part or all of the channels other than the channel executing the coding using intraframe predictive coding technique while increasing the amount of transmitted information for said channel, wherein said specified time intervals are non-constant.

3. A method as set forth in claim 1, wherein said coding step at the transmitting side is simultaneously carried out on two or more of said channels.

4. A method as set forth in claim 2, wherein said coding step at the transmitting side is simultaneously carried out on two or more of said channels.

5. An apparatus for transmitting time-varying picture signals for a plurality of channels via a multiplex transmission line of constant speed, comprising:

at a transmitting side,
   an encoder for each channel for normally coding said time-varying picture signals by utilizing an interframe predictive coding technique and embedding a signal showing an interframe predictive coding mode into said time-varying picture signals, and, while the time-varying picture signals are being transmitted, coding said time-varying picture signals by utilizing an intraframe predictive coding technique and embedding a signal showing an intraframe predictive coding mode into said time-varying picture signals when instructed;
   a refresh control portion connected to said encoder of each channel for instructing said encoder of each channel to code said time-varying picture signals in a short period of time repeatedly at specified time intervals per predetermined number of pixels in a frame by utilizing the intraframe predictive coding technique so that a predetermined number of pixels in said frame are refreshed for said channel during a time-varying picture transmission through said multiplex transmission line, while decreasing, during said coding by intraframe predictive coding technique, the amount of transmitted information for part or all of the channels other than the channel executing said coding by intraframe predictive coding technique and increasing the amount of transmitted information for said channel; and
   a multiplexer connected to said refresh control portion and to each encoder for multiplexing said coded signals entered from each encoder to said multiplexer and sending a multiplexed signal to the multiplex transmission line;
   and at a receiving side,
   a demultiplexer for receiving and separating said multiplexed signal;
   a selector connected to said demultiplexer and operative for selecting a desired channel; and a decoder connected to said selector for decoding signals of a selected channel by utilizing one of an interframe predictive decoding technique and an intraframe predictive decoding technique in accordance with the signal showing a mode of predictive coding in the entered signals of the selected channel, wherein said refresh control portion instructs said encoder of each channel to code said time-varying picture signals in a short period of time repeatedly at said specified time intervals which are non-constant.

6. An apparatus for transmitting time-varying picture signals for a plurality of channels via a multiplex transmission line of constant speed, comprising:

at a transmitting side, an encoder for each channel for normally coding time-varying picture signals by utilizing interframe predictive coding technique and embedding a signal showing an interframe predictive coding mode into said time-varying picture signals, and, while the time-varying picture signals are being transmitted, coding said time-varying picture signals by utilizing an intraframe predictive coding technique and embedding a signal showing an intraframe predictive coding mode into said time-varying picture signals when instructed;

a refresh control portion connected to each encoder for instructing said encoder of each channel to code said time-varying picture signals in a short period of time repeatedly at specified time intervals per predetermined number of scanning lines in a frame by utilizing the intraframe predictive coding technique so that a predetermined number of scanning lines in said frame are refreshed for said channel during a time-varying picture transmission through said multiplex transmission line, while decreasing, during said coding by intraframe predictive coding technique, the amount of transmitted information for part or all of the channels other than the channel executing said coding by intraframe predictive coding technique and increasing the amount of transmitted information for said channel; and a multiplexer connected to said refresh control portion and to each encoder for multiplexing said coded signals entered from each encoder to said multiplexer and sending a multiplexed signal to the multiplex transmission line;

and at a receiving side, a demultiplexer for receiving and separating said multiplexed signal;

a selector connected to said demultiplexer and operative for selecting a desired channel; and a decoder connected to said selector for decoding a selected channel signals by utilizing one of an interframe predictive decoding technique and an intraframe predictive decoding technique in accordance with the signal showing a mode of predictive coding in the entered signals of the selected channel, wherein said refresh control portion instructs said encoder of each channel to code said time-varying picture signals in a short period of time repeatedly at said specified time intervals which are non-constant.

* * * * *